J. M. WILSON.
Corn-Shelling Implement.

No. 167,597.          Patented Sept. 7, 1875.

Witnesses.
J. Crawford Jr.
Saml. M. Barton

Inventor.
J. M. Wilson
by his attys
Carroll D. Wright & Brown

UNITED STATES PATENT OFFICE.

JOHN M. WILSON, OF NASHUA, NEW HAMPSHIRE.

IMPROVEMENT IN CORN-SHELLING IMPLEMENTS.

Specification forming part of Letters Patent No. 167,597, dated September 7, 1875; application filed January 13, 1875.

*To all whom it may concern:*

Figure 1:
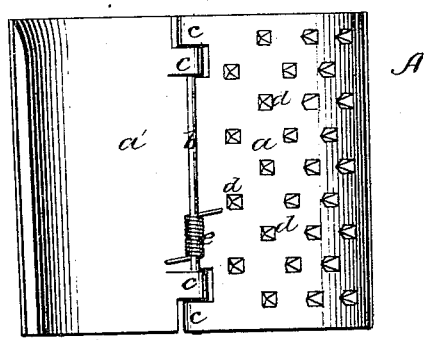
Figure 2:
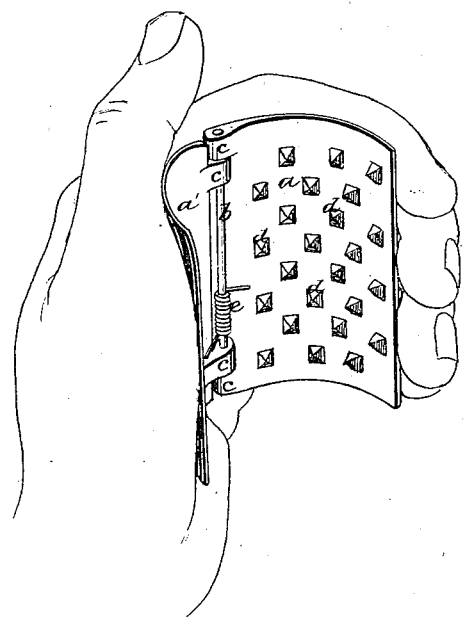

Be it known that I, JOHN M. WILSON, of Nashua, in the county of Hillsborough and State of New Hampshire, have invented certain Improvements in Corn-Shellers, of which the following is a specification:

Figure 1 is a side view, showing the sheller open. Fig. 2 is a perspective view, showing the sheller as held during operation.

My invention has for its object to provide a neat and convenient implement to be held in the hand for the purpose of shelling corn in small quantities, its design being particularly to provide means for expeditiously shelling pop-corn for household use without injury to the hands and without scattering the corn. To this end my invention consists in two plates, hinged together and adapted to open and close like an ordinary butt-hinge, the plates being of such size as to be readily grasped and inclosed by the hand. The proximate sides of the plates are concave, and one of them is provided with suitable teeth or corrugations, which remove the corn from an ear placed and turned between the plates, the latter being preferably provided with a spring, which forces them open when the pressure of the hand is relaxed or removed, all of which I will now proceed to describe.

In the drawings, A represents the sheller, composed of two plates, $a$ $a'$, hinged together by a rod, $b$, passing through ears $c$ $c$ on their adjoining edges. The plates are thus adapted to open and close, as shown in the drawings. Their proximate faces are concave, as shown in Fig. 2, and the concave face of the plate $a$ is provided with teeth or corrugations $d$. The plate $a'$ is somewhat wider at one end than at the other, and its wider end is beveled outwardly from the concave side, as shown in Fig. 1. By this means the sheller is made with a larger and smaller end. $e$ represents a spring applied to the pivotal rod $b$ in such manner as to force the plates open, as shown in Fig. 1, the back of said plates being so formed as to abut against each other when sufficiently opened. The sheller is grasped by the left hand, as shown in Fig. 2, and the large end of the ear of corn is inserted into the larger end of the sheller. Then by turning the right hand toward the right the corn is easily detached by the toothed plate $a$, the smooth plate $a'$ acting to press the ear against the teeth.

By this means the corn is easily and expeditiously shelled without injury to the operator's hands. The shelled corn falls between the plates into a suitable receptacle, and is not liable to be scattered. One of the plates is made smooth, so as to enable the sheller to be more easily operated.

I claim as my invention—

A hand corn-sheller, consisting of the toothed concave plate $a$ and smooth concave plate $a'$, each hinged to the other, and provided with the spring $e$ supported on the hinging-rod $b$, substantially as and for the purpose described.

In testimony whereof I have signed my name to this specification in the presence of two subscribing witnesses.

JOHN M. WILSON.

Witnesses:
E. P. EMERSON,
S. E. JAQUITH.